(12) United States Patent
Montelimard

(10) Patent No.: US 8,543,321 B2
(45) Date of Patent: Sep. 24, 2013

(54) METHOD FOR FORECASTING THE EVOLUTION OF THE MAGNITUDE OF A DATA FOR A VEHICLE JOURNEY

(75) Inventor: Romain Montelimard, Saint Chamond (FR)

(73) Assignee: Renault Trucks, St. Priest (FR)

( * ) Notice: Subject to any disclaimer, the term of this patent is extended or adjusted under 35 U.S.C. 154(b) by 0 days.

(21) Appl. No.: 13/496,228

(22) PCT Filed: Sep. 25, 2009

(86) PCT No.: PCT/IB2009/007204
§ 371 (c)(1),
(2), (4) Date: Mar. 15, 2012

(87) PCT Pub. No.: WO2011/036512
PCT Pub. Date: Mar. 31, 2011

(65) Prior Publication Data
US 2012/0179360 A1    Jul. 12, 2012

(51) Int. Cl.
*G06F 19/00* (2011.01)
*G01C 21/00* (2006.01)
*F02B 17/00* (2006.01)

(52) U.S. Cl.
USPC ............ 701/123; 701/408; 701/409; 123/295

(58) Field of Classification Search
USPC ......................................... 701/123, 408, 409
See application file for complete search history.

(56) References Cited

U.S. PATENT DOCUMENTS 5,750,887 A * 5/1998 Schricker ................. 73/114.55
5,848,371 A   12/1998 Creger
6,119,065 A * 9/2000 Shimada et al. ............. 701/533
6,321,157 B1 * 11/2001 Sun et al. ..................... 701/103
6,920,473 B2 * 7/2005 Elbe et al. ..................... 708/492

(Continued)

FOREIGN PATENT DOCUMENTS

DE    102008050022 A1    5/2009
DE    102008006051 A1    7/2009

(Continued)

OTHER PUBLICATIONS

Master Math Calculus by Debra Anne Ross, Publisher—Course Technology PTR, ISBN -10: 1-59863-986-2. Copyright 1998 Library of Congress controll No. 2009924627.*

(Continued)

*Primary Examiner* — Thomas Black
*Assistant Examiner* — Tyler Paige
(74) *Attorney, Agent, or Firm* — WRB-IP LLP

(57) ABSTRACT

The magnitude (Y) of a data associated to a journey of an automotive vehicle is expressed by a function (f) of at least one input parameter (x). This method includes at least the steps of:

a) defining a first model ($f_{t=0}$) of the function;
b) running the vehicle on a reference trip, the input parameter (x, m, p) and the magnitude (Y) being measured ($Y_M$, $x_M$) during or at the end of the reference trip;
c) computing a value ($Y_C$) of the magnitude by using the first model ($f_{t=0}$) of the function (f) and the value of the parameter ($x_M$) measured at step b);
d) comparing the values ($Y_M$, $Y_C$) of the magnitude at said time; and
e) adjusting the function ($f_{t=1}$) in a way corresponding to the reduction of the difference between the measured value ($Y_M$) and the computed value ($Y_C$).

14 Claims, 2 Drawing Sheets

(56) References Cited

U.S. PATENT DOCUMENTS

| | | | |
|---|---|---|---|
| 7,174,713 B2 * | 2/2007 | Nitzke et al. | 60/605.2 |
| 2002/0107618 A1 | 8/2002 | Deguchi et al. | |
| 2003/0158658 A1 * | 8/2003 | Hoever et al. | 701/209 |
| 2004/0034460 A1 | 2/2004 | Folkerts et al. | |
| 2004/0039520 A1 * | 2/2004 | Khavakh et al. | 701/201 |
| 2007/0265805 A1 * | 11/2007 | Lee et al. | 702/187 |
| 2008/0264398 A1 * | 10/2008 | Schondorf et al. | 123/674 |
| 2009/0150992 A1 * | 6/2009 | Kellas-Dicks et al. | 726/19 |

FOREIGN PATENT DOCUMENTS

| | | |
|---|---|---|
| DE | 102008010558 A1 | 9/2009 |
| EP | 0846945 A1 | 6/1998 |
| WO | 2009022194 A1 | 8/2007 |

OTHER PUBLICATIONS

International Search Report for corresponding International application No. PCT/IB2009/007204.

* cited by examiner

METHOD FOR FORECASTING THE EVOLUTION OF THE MAGNITUDE OF A DATA FOR A VEHICLE JOURNEY

BACKGROUND AND SUMMARY

This invention concerns a method for forecasting the evolution of the magnitude of a data associated to a journey of an automotive vehicle.

Onboard electronic control devices are used on automotive vehicles, in particular on trucks, in order to control equipments or subsystems, such as an internal combustion engine or a gearbox. WO-A-2009/022194 discloses a system for adjusting the control parameters of an onboard electronic control device which allows the user to input some information with respect to a specific constraint to be followed during a given journey or type of journey. This is efficient insofar as the computations of the onboard electronic control device are accurate.

In the coming years, the cost of energy will increase, in particular for what concerns fossil energies like fuel. On the other hand, the impact of automotive vehicles on the environment must be decreased. A way to achieve a relatively small impact on the environment is to decrease fuel consumption and pollutant emissions of an automotive vehicle by choosing the best roads ahead of a vehicle and to anticipate, as much as possible, the power request and the engine work of the vehicle. For instance, an electronic horizon, including digitalized maps, can be used and give the different roads available for a journey. Such an electronic horizon can be combined with an automated manual transmission system which can advise the driver about the optimal gear to use at each point on a journey. All this is based on an accurate forecasting of the fuel consumption of the vehicle. If this forecasting is not accurate enough, the choice of the best road or the best gear to be used by the driver can be non-optimal. This can even lead to an increased fuel consumption.

The invention aims, according to an aspect thereof, at providing a method for forecasting the evolution of the magnitude of a data which allows to efficiently use computerized systems in order to select the best running conditions for a vehicle.

To this purpose, an aspect of the invention concerns a method for forecasting the evolution of the magnitude of a data associated to a journey of an automotive vehicle via a mathematical model, where said magnitude is expressed by a function of at least one input parameter, wherein this method includes at least the steps of:

a) defining a first model of the function used for computing the magnitude of the data, on the basis of the input parameter;

b) running the vehicle on a reference trip, the input parameter and the magnitude being measured at least at one time during or at the end of the reference trip;

c) computing a value of the magnitude of the data by using the first model of the function and the value of the parameter measured at step b);

d) comparing the values of the magnitude of the data at said time, respectively measured at step b) and computed at step c); and e) depending on the result of the comparison of step d), adjusting the function in a way corresponding to the reduction of the difference between the measured value and the computed value.

Thanks to aspects of the invention, one uses steps a) to e) as a self-learning process to help the onboard electronic computation system of the vehicle to improve the accuracy of the forecasting of the magnitude of the data which is associated to a given journey. For instance, the forecasting of the fuel consumption becomes more accurate, which enables the onboard computation means to efficiently select a road to be followed and/or a gear to be used during a given journey.

According to further aspects of the invention, such a method might incorporate one or several of the following features:

Steps b) to e) are implemented several times, on successive reference trips, the function adjusted in a step e) being used to compute the value of the magnitude of the data on the next step c).

The reference trip is a part of the journey to be followed by the vehicle, preferably an initial part thereof.

The computation of step c), the comparison of step d) and the adjustment of step e) occur in real time.

In step a), the first model is based on an initial data set for the function. Alternatively, this model is based on the last data set used for the function in a previous journey of the vehicle.

The magnitude of the data is expressed as a polynomial function of one parameter in the form:

$$Y = \sum_{i=0}^{N} a_i x^i$$

where x is the input parameter, N is an integer larger than 1 and $a_i$ is a real number for i integer between 0 and N, and wherein the first model includes a set of N+1 real numbers corresponding to values of $a_i$ for i integer between 0 and N. In such a case, adjustment of the function advantageously occurs by adjusting the respective values of real numbers $a_i$ for d integer between 0 and N.

Alternatively, the magnitude of the data is expressed as the polynomial function of several parameters in the form:

$$Y = Ax + B\frac{dx}{dt} + Cm + Dp + E$$

where x is a distance travelled during a reference trip, a journey or a part of a journey, m is the mass of the vehicle, p is the tire pressure, and A, B, C, D and E are real numbers, whereas the first model includes a set of real numbers corresponding to A, B, C, D and E. In such a case, adjustment of the function advantageously occurs by adjusting the respective values of numbers A, B, C, D and E.

According to another approach, the magnitude of the data is expressed as a function of a parameter which depends on the driver's behaviour and the first model includes a set of numbers which are advantageously selected in step e) depending on the driver's behaviour determined on the reference trip.

BRIEF DESCRIPTION OF THE DRAWINGS

The invention will be better understood on the basis of the following description which is given in correspondence with the annexed figures and as an illustrative example, without restricting the object of the invention which is defined by the appended claims. In the annexed figures:

DETAILED DESCRIPTION

Figure 1:
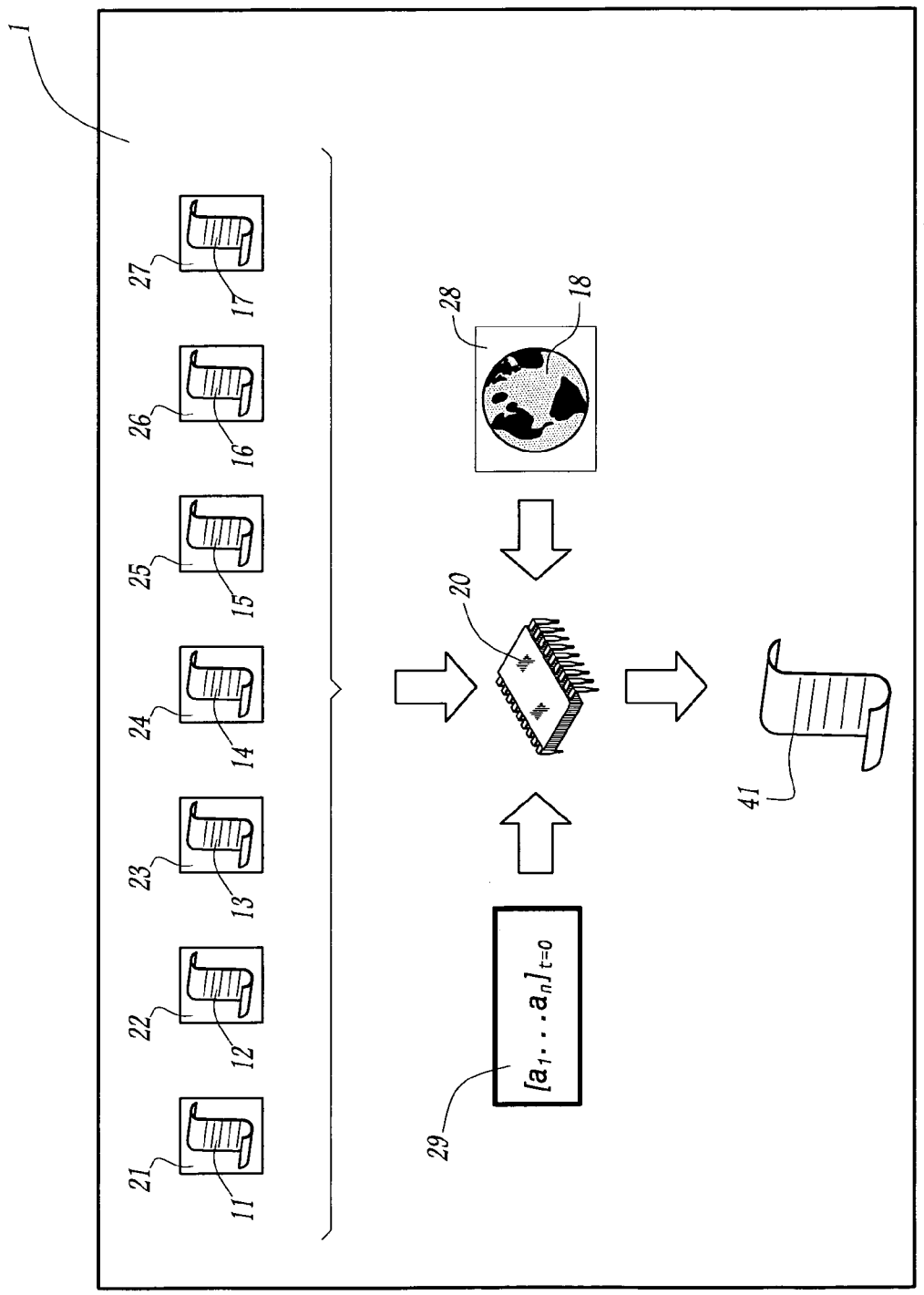
FIG. 1 is a schematic representation of an onboard electronic computation system used to implement the method of the invention and FIG. 2 is a block diagram of the method of the invention.

The onboard computation system 1 represented on FIG. 1 includes several data sets 11 to 17 stored in corresponding memories 21 to 27. Data set 11 is a model for the internal combustion engine of the vehicle. Data set 12 is a model for the hybrid components of the powerline of the vehicle. Data set 13 is a model for the gearbox of the vehicle. Data set 14 is a model for the driveline of the vehicle. Data set 15 is a model for the tires of the vehicle, depending amongst others on the tire pressure. Data set 16 is a model for the general behaviour of the vehicle, including its mass and gravity center. Data set 17 is a model for the driver, including a typical behaviour of each known driver.

The data of data sets 11 to 17 are provided to calculation means such as an on-board computer 20 which works in "real time" in order to perform the steps of a method described hereunder.

Another data set 18 includes digitalized maps of a region where the vehicle is supposed to travel, e.g. a country or a continent. Data set 18 is stored in a memory 28.

Computer 20 can access data sets 11 to 18 in order to retrieve some information from the respective models and to deliver a data set 41 including recommendations to the driver in order to optimize the magnitude of some physical parameters, such as fuel consumption, in view of a journey to be done with the vehicle.

A specific use of the invention concerns the case where the vehicle is a truck which regularly travels the same journey or the same kind of journey. However, the invention can also be used with personal cars.

Computer 20 works in real time insofar as it has all priority to run quickly, that is quickly enough for the information 41 to be considered as immediate by the application using this information. Computer 20 can be dedicated to the method of the invention or this method can have the highest priority amongst different computations to be made by computer 20.

Data set 41 includes the values of several data associated with a journey to be followed by the truck equipped with onboard computation system 1. The magnitude of each of these data Y can be expressed as $$Y = f(x_1, x_2, x_3, \ldots x_p)$$

where f is a function having one or several input parameters, namely $x_1, x_2 \ldots x_p$. For example, this data Y can be the total fuel consumption of the truck since the beginning of the journey.

The relevance of the suggestion included in data set 41 depends on the accuracy of the computation of the magnitude of this fuel consumption Y. Depending on the complexity of the model selected to compute the value of Y and on the computing capacities of computer 20, function f can be a simple linear equation of the type Y=ax+b, where x is the distance travelled since the beginning of the journey and a and b are two real numbers. Function f can be as complex as a representation thanks to a finite element method (FEM). Such a finite element method can be used, for instance, to compute thermal data relating to the internal combustion engine. The choice of the complexity of the function f is based on a compromise between calculation power of computer 20 and the accuracy required.

Example 1

Fuel consumption Y can be expressed as $$Y = \sum_{i=0}^{N} a_i x^i$$

where x is the distance travelled since the beginning of a journey, N is an integer larger than 1 and $a_i$ is a real number, for i between 0 and N. In other words, Y is expressed as a polynomial function of x.

Actually, such a definition can be given for all models associated to each data set 11 to 17 which can express the magnitude Y of a data as a function of one input parameter.

According to the invention, when a journey is supposed to be made with the truck equipped with onboard computer system 1, one defines a first model for each function f.

In the example here-above, one defines a set of parameters $[a_0, a_1 \ldots a_N]_{t=0}$ which corresponds to a first set of numbers $a_0$ to $a_N$ used to compute the magnitude of fuel consumption Y on the basis of the distance x run from the beginning of a journey. The selection of such numbers $[a_0, \ldots a_N]_{t=0}$ is performed in a first step 101 of the method which takes place as soon as onboard computation system detects that some computations will be needed to determine fuel consumption Y along a given journey.

The set of parameters or numbers $[a_0, a_1 \ldots a_N]_{t=0}$ is selected from a memory 29 of system 1 and it is provided to computer 20. This set of numbers can be stored for this purpose as an initial set of numbers which is used when one runs the truck for the first time or in new conditions, e.g. after a maintenance operation or with a new driver.

Alternatively, this first set of numbers $[a_0, a_1 \ldots a_N]_{t=0}$ selected in step 101 can be identical to the last corresponding set of numbers used for the previous computation of the magnitude Y of fuel consumption.

This first set of numbers $[a_0, \ldots a_N]_{t=0}$ is used to build a first model $f_{t=0}$ for function f to express fuel consumption Y as $$Y = \sum_{i=0}^{N} [a_i]_{t=0} x^i$$

In a second step 102 of the invention, one runs the truck on a reference trip, e.g. one kilometer. This reference trip is advantageously the first kilometer of the journey to be travelled with a truck equipped with system 1. During step 102 or at the end of this step, one measures the or each input parameter, e.g. the distance travelled x in our example, and the magnitude of the data supposed to be computed by computer 20, namely the fuel consumption Y in our example. For the sake of simplicity, one considers here that these values are measured at the end of the reference trip, as $Y_M$ and $x_M$.

According to an alternative embodiment of the method of the invention, the reference trip can be different from the first kilometer of the trip, e.g. a given distance after a few minutes of travel, in order to take into account working conditions of the engine with hot oil. The reference trip can also be defined by its duration, e.g. one minute or five minutes, after an initial event, e.g. start of the internal combustion engine. Alternatively, the reference trip can be made on a given circuit prior to starting the journey to be travelled with a truck.

Once all input parameters, such as distance x, have been determined in step 102, then one computes in step 103 a value $Y_C$ of the magnitude Y of the data such as fuel consumption. This computation is made on the basis of the first model $f_{t=0}$ of function f built in step 101

In a further step 104, one compares the measured value $Y_M$ and the computed value $Y_C$ of the magnitude Y of the fuel consumption.

If the difference $\Delta Y$ between these values is null, then one goes to a further step 110 where the definition of function f is provided to onboard computation system 1 as the definition of data Y for the rest of the journey.

Depending on the accuracy to be reached, the value of $\Delta Y$ can be considered to be equal to zero when its absolute value is for example less than 2%, or less than 5%, of the value of $Y_M$.

If $\Delta Y$ is not null, then one goes to a further step 105 where the set of parameters $a_0$ to $a_N$ is modified in order to minimize the difference $\Delta Y$. Such a modification is obtained on the basis of regular algorithms used for function optimizations.

As a result of this modification, one obtains a new set of real numbers $[a_0, a_1 \ldots a_N]_{t=1}$ which is used for further computations of the magnitude of data Y on the basis of input parameter x.

Figure 2:
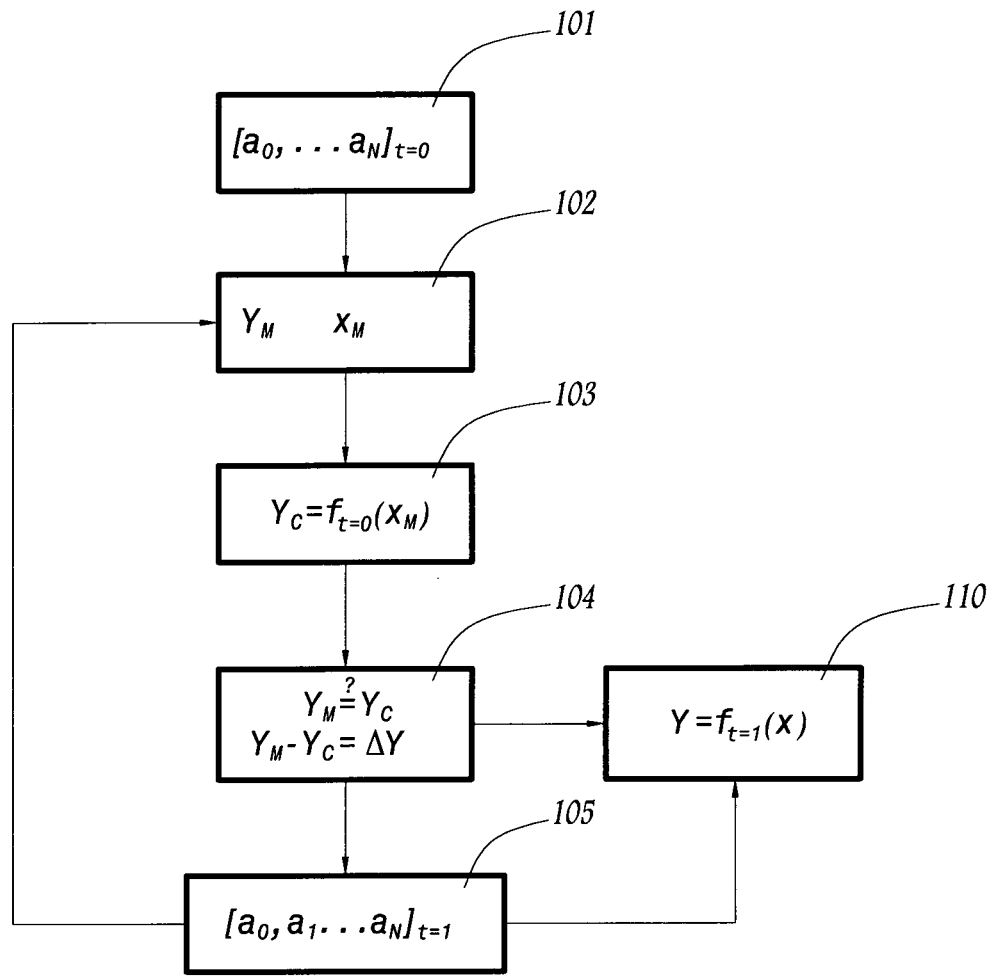

From step 105, it is possible to go to step 110 or to iterate steps 102 to 105 in order to obtain a more and more accurate expression of the magnitude of data Y, on the basis of input parameter x, as shown by the arrow on the left of FIG. 2.

For example, steps 102, 103, 104 and 105 can be implemented five times on the first five kilometres of a journey to be travelled with a truck equipped with onboard computation system 1. Then, the second model $f_{t=1}$ of function f is used as a first model in step 102, a third model $f_{t=2}$ is built in subsequent step 106 and so on.

Example 2

In some cases, the value of a data depends on several parameters. For instance, the fuel consumption Y can depend on the distance x travelled since the beginning of a journey, on the speed dx/dt, on the mass m of the truck and on the tire pressure p. Then the fuel consumption can be expressed as $Y = Ax + B\, dx/dt + Cm + Dp + E$ where A, B, C, D and E are real numbers.

According to the invention, in a first step 101 of the method, one selects a first set of value $A_0, B_0, C_0, D_0$ and $E_0$ used to make a first computation of the magnitude Y of the fuel consumption.

Then one runs steps 102 to 104 as explained here-above and, in step 106, one determines a new set of real numbers $A_1$, $B_1, C_1, D_1$ and $E_1$ to be used for further computation of the magnitude of fuel consumption Y.

Example 3

Some other input parameters can be taken into account in order to determine the magnitude of a data. For instance, fuel consumption might depend on the driving style of the driver which is linked to the speed or the speed variations on a journey. Then fuel consumption, or at least part of it, could be expressed as $Y = P\, dx/dt + Q$ where x is the distance travelled since the beginning of the journey and P and Q are real numbers, one can start computation of fuel consumption with a first set of parameters $P_0$ and $Q_0$. Then, one runs a reference trip and makes computations and comparisons as explained here-above in steps 102 to 105. As the result of step 105, one uses a new set of parameters $P_1$, $Q_1$ when the driving style of the driver has been identified, as "fuel-eco concerned" or "dynamic", depending on the speed dx/dt on the reference trip.

In such a case, the comparison at step 104 leads to the selection of two different sets of parameters P and Q for further computation of the data, depending on the sign of $\Delta Y$. For instance, if $\Delta Y$ is positive, then fuel consumption is higher than expected with an average behaviour and a set of parameters $P_{1S}, Q_{1S}$ corresponding to a "dynamic" behaviour is selected. If $\Delta Y$ is negative, a set of parameters $P_{1E}, Q_{1E}$ corresponding to a "fuel-eco concerned" behaviour is selected.

Examples 1 to 3 here-above are notlimitative and any function can be used with the invention to express the magnitude Y of a data on the basis of one or several parameters x, m, p, etc. . . . . The more complex this function is, the more powerful computer 20 must be.

In all examples, the initial set $[a_0, \ldots a_N]_{t=0}, A_0, B_0, C_0, D_0$ and $E_0$ or $P_0$ and $Q_0$ used in step 102 can be identical to the last number set, e.g. $[a_0, \ldots a_N]_{t=1} A_1, B_1, C_1, D_1$ and $E_1$ or $P_{1S}$ and $Q_{1S}$, used for the model of function f for the previous journey of the truck. In other words, one benefits from the optimisation of function f already performed during the last journey of the truck.

The invention has been explained here-above in case it is used to forecast fuel consumption on a given journey. It can also be used to forecast the variation of other data associated to a journey, such as the engine load, in order to increase the life time of the automotive vehicle, the pollutant emissions, the regeneration time of exhaust after treatment system(s) during the travel, etc. . . . .

The exploitation of the accurate forecasting of the magnitude of these data can be used to optimize driving strategy for what concerns gear shifting, braking, use of auxiliary equipments, etc. . . . .

The efficiency of the self learning proceedings explained with respect to steps 101 to 105 can be increased by choosing a reference trip where transient speed and load are used, high frequency gear shifting and brake use place and the path includes curved sections, which enables to take into account the lateral behaviour of the truck.

The invention claimed is:

1. A method for forecasting the evolution of the magnitude of a data associated to a journey of an automotive vehicle via a mathematical model and for selecting the best miming conditions for a vehicle, in an onboard computer computation system, where the magnitude is expressed by a function of at least one input parameter, comprising:

defining a first model of the function used for computing the magnitude on the basis of the input parameter;

running the vehicle on a reference trip, for a given time or a given distance, the input parameter and the magnitude being measured ($Y_M, x_M$) to provide a measured value of the magnitude at least at one time during or at the end of the reference trip;

computing a computed value of the magnitude by using the first model of the function and the value of the parameter measured at the running step;

comparing the values of the magnitude at the at least one time measured at the running step and computed at the computation step;

if the comparison of the measured value and the computed value reveals a difference greater than a predetermined difference value between the measured value and the computed value, adjusting the function in a way corresponding to a reduction of the difference between the measured value and the computed value; and selecting by onboard computation means, based on the forecasting of the magnitude of the data associated to a given journey, a road to be followed.

2. Method according to claim 1, comprising performing the running step, the computation step the comparison step, and the adjustment step successively, a plurality of times, the function adjusted in the adjustment step of a preceding performance of the running step, the computation step, the comparison step, and the adjustment step being used to compute the value of the magnitude on a next performance of the running step, the computation step, the comparison step, and the adjustment step.

3. Method according to claim 1, wherein the reference trip is a part of the journey to be followed by the vehicle.

4. Method according to claim 3, wherein the reference trip is an initial part of the journey.

5. Method according to claim 1, wherein the computation step, the comparison step and the adjustment step occur in real time.

6. Method according to claim 1, wherein in the defining step, the first model is based on an initial data set for the function.

7. Method according to claim 1, wherein in the defining step, the first model is based on the last data set used for the function in a previous journey of the vehicle.

8. Method according to claim 1, wherein the magnitude (Y) of the data is expressed as a polynomial function of one parameter in the form $$Y = \sum_{i=0}^{N} a_i x^i$$

where x is the input parameter, N is an integer larger than 1 and $a_i$ is a real number for i integer between 0 and N, and wherein the first model includes a set of N+1 real numbers $([a_0, \ldots a_N]_{t=0})$ corresponding, to values of $a_i$ for i integer between 0 and N.

9. Method according to claim 8, wherein in the comparison step, adjustment of the function occurs by adjusting the respective values $([a_0, \ldots a_N]_{t=0})$ of real numbers $a_i$ for i integer between 0 and N.

10. Method according to claim 1, wherein the magnitude (Y) of the data is expressed as a polynomial function of several parameters in the form, $$Y = Ax + B\frac{dx}{dt} + Cm + Dp + E$$

where x is a distance travelled during a reference trip, a journey or a part of a journey, m is the mass of the vehicle, p is the tire pressure, and A, B, C, D and E are real numbers and wherein the first model includes a set of real numbers $(A_0, B_0, C_0, D_0$ and $E_0)$ corresponding to A, B, C, D and E.

11. Method according to claim 10, wherein in the comparison step, adjustment of the function occurs by adjusting the respective values $(A_1, B_1, C_1, D_1$ and $E_1)$ of numbers A, B, C, D and E.

12. Method according to claim 1, wherein the magnitude of the data is expressed as a function of a parameter $$\left(\frac{dx}{dt}\right)$$

which depends on the driver's behaviour and wherein the first model includes a set of numbers.

13. Method according to claim 12, wherein in the comparison step, adjustment of the function occurs by selecting a set of numbers which depends on the driver's behaviour determined on the reference trip.

14. Method according to claim 1, wherein the data comprises fuel consumption.

* * * * *